Patented July 11, 1950

2,515,139

UNITED STATES PATENT OFFICE 2,515,139

FLUOROALKYLTHIOPHENES

William A. Stover and Alexander N. Sachanen, Woodbury, N. J., assignors to Socony-Vacuum Oil Company, Incorporated, a corporation of New York No Drawing. Application June 7, 1947, Serial No. 753,382

10 Claims. (Cl. 260—329)

This invention relates to fluorine-containing thiophene compounds and, more particularly, is directed to a thiophene having a fluoroalkyl chain and to a method for synthesizing said compounds.

As is well known, elementary fluorine is not generally employed for direct fluorination of organic compounds because of its extreme chemical reactivity and the difficulties encountered in its handling. Organic fluorine compounds have in the past been prepared, with very few exceptions, by round-about procedures. Such methods have varied, depending in part on the nature of the compound undergoing treatment. Procedures useful, for example, in effecting fluorination of aromatic hydrocarbons are not generally applicable in synthesizing fluorine-containing thiophene compounds. Such is particularly the case where, as in the present invention, it is desirous of preparing a thiophene derivative having a fluorine-containing alkyl side chain. Methods for preparing derivatives of benzene having fluorine present in a side chain cannot be used in preparing the aforementioned thiophene derivatives and in so far as is known, thiophene compounds having a fluorine-containing organic side chain have not heretofore been synthesized.

It is accordingly an object of this invention to prepare a thiophene having a fluorine-containing organic radical attached to the thiophene nucleus. A further object is to effect the synthesis of a thiophene having a fluoroalkyl group. A still further object is the provision of a method for preparing a thiophene having a polyfluorinated alkyl group. These and other objects which will appear hereinafter are attained in accordance with the present invention.

It is to be noted that the compounds contemplated by the present invention are those having fluorine contained in an organic side chain which is attached to the thiophene ring through a carbon to carbon linkage. These compounds will generally be designated herein as fluoroalkyl thiophenes and are to be distinguished from compounds containing a nuclear fluorine substituent where fluorine is attached directly to a carbon atom of the thiophene ring.

In accordance with this invention, it has been discovered that thiophene derivatives having fluorine-containing organic side chains can be effectively prepared by reacting a halogenated thiophene, sodium, and a heterohalogenated alkane containing at least one fluorine atom. The fluoroalkyl thiophenes of this invention are obtained by contacting the aforementioned chemicals at a temperature between about 50° C. and about 150° C. in the presence of an inert organic solvent. Preferably, the temperature at which the reaction takes place is between about 50° C. and about 100° C. Under such conditions it has been found that a reaction takes place in which the halogen substituent of the thiophene is replaced by a fluoroalkyl chain corresponding to the heterohalogenated, fluorine-containing alkane employed as a reactant.

The mechanism by which the above reaction proceeds to give the desired fluoroalkyl thiophenes of this invention is not known with certainty. However, it would appear that the sodium undergoes reaction with the halogenated thiophene, replacing the halogen substituent with sodium, and the substituted sodium thiophene then condenses with the heterohalogenated fluorine-containing alkane present to split out sodium halide and to yield a thiophene having a fluoroalkyl side chain. This postulation, of course, is not to be taken as limiting the scope of the invention but is set forth merely as an aid in understanding and as a reasonable basis upon which the reaction of this invention can be explained.

It has been found that all three of the aforementioned reactants are essential to attain the desired compounds of this invention. The thiophene reactant to be employed in the present process may contain one or more alkyl substituents, it being essential, however, that the reactant contain at least one halogen substituent. Thus, a monohalogenated thiophene will preferably be employed and, in particular, chlorothiophene.

The heterohalogenated, fluorine-containing alkane may be of any desired chain length but, in addition to having a fluorine substituent, the alkane should essentially contain at least one other halogen substituent which may be either a chlorine, bromine or iodine atom, and which may either be attached to the same or to a different carbon atom as the fluorine substituent. Representative of the heterohalogenated, fluorine-containing alkanes contemplated for use in the present reaction, are the substituted paraffin hydrocarbons such as fluorochloromethane, fluorobromomethane, difluorochloromethane, dibromofluoromethane, difluorobromoethane, tetrafluorochloroethane, dichlorotrifluoroethane, trichlorotrifluoroethane, dichlorodifluoroethane, difluorochloropropane, fluorochloropropane, fluorodichlorobutane, difluorobromobutane, difluorochlorobutane, difluorochloropentane, difluorochloromethyl pentane, difluorodichloropentane, etc. The above list, of course, is not to be construed as limiting, since a number of other heterohalogenated, fluorine-containing alkanes which will readily occur to those skilled in the art may likewise be employed in the process of this invention.

Sodium may be introduced into the reaction mixture as metallic sodium or in the form of an alloy containing sodium in substantial proportion, preferably as its major component. A particularly effective means for introducing sodium into the reaction mixture is from a sodium amalgam. The use of a sodium amalgam has generally been found to give higher yields of the desired thiophene compounds than the use of metallic sodium. This increased yield of product appears to be due primarily to the fact that sodium in the form of an amalgam is in an extremely finely sub-divided state, presenting a very extensive reaction surface. In general, it may be stated that the reaction rate, and consequently the yield of desired product, is dependent on the particle size of the sodium. As a rule, the smaller the particle size of sodium used, the faster was the rate of reaction. Accordingly, finely divided sodium, such as sodium amalgam, sodium shot, and sodium sand, is to be preferred for use in the present process.

The reaction of this invention is suitably carried out in an inert atmosphere and in the presence of an inert organic solvent such as an ether, toluene, benzene, etc., or mixtures thereof. The order in which the reactants are brought into contact is of importance in controlling the direction of the reaction. It has been found that contact of sodium with the heterohalogenated, fluorine-containing alkane reactant should take place not prior to contact of the sodium with the halogenated thiophene reactant. When all three reactants are brought more or less simultaneously into contact with each other, the reaction appears to be selective in that the sodium preferably reacts with the halogenated thiophene. However, in order to maintain side reactions at a minimum, it is preferred to add the alkane reactant subsequently to a reaction mixture of halogenated thiophene and sodium.

It is essential that the temperature at which the reaction is carried out in accordance with this invention be between about 50° C. and about 150° C. At temperatures below 50° C., no yield of the desired fluoroalkyl thiophene was obtained. Likewise, at a temperature above 150° C., substantially no reaction yielding a fluoroalkyl thiophene was found to take place. The decrease in yield at the higher temperatures is undoubtedly due to the fusion of the sodium particles employed, since the yield is substantially lowered above the melting point of sodium and decreases with higher temperatures up to a limit of about 150° C. Accordingly, for purposes of the present invention, the temperature limits of 50° C. and 150° C. are to be considered critical and the preferred temperature range is between about 50° C. and 100° C. The reaction may, if desired, be carried out under pressure, although ordinarily the process proceeds readily at atmospheric pressure. Usually when a pressure is employed, it will be sufficient to maintain the reactants in the liquid phase and this will be dependent on the particular temperature range involved, said temperature necessarily being within the above stated limits.

Due to the high reactivity of the reactants employed, it is essential to exclude moisture and air from the reaction zone and to carry out the process of this invention in an inert atmosphere, such as nitrogen or other of the inert gases. If the inert solvent employed is one of low boiling point, such as an ether, the vapor of said solvent may provide the inert atmosphere under which the reaction takes place.

After the reaction between the halogenated thiophene compound, sodium, and heterohalogenated fluorine-containing alkane is finished, the fluoroalkyl thiophene which is formed thereby is separated from the reaction mixture and inert solvents by fractionation. The fluoroalkyl thiophene compounds of this invention are of high reactivity and by bringing said compounds in contact with substances containing reactive groups or atoms, a large number of different thiophene derivatives can be prepared. Thus, the fluoroalkyl thiophenes are useful in the synthesis of various derivatives of thiophene, which, in turn, find use in the manufacture of plastics, pharmaceuticals, insecticides, dyes, addition agents for petroleum fractions, odorants, synthetic lubricants, waxes, extreme pressure additives for mineral oils, and anti-foaming agents. The compounds of this invention may also be coupled or condensed with other molecules, be acted with various organometallic compounds and, in general, undergo a multitude of reactions which will be recognized by those skilled in the art.

The following detailed example will serve to illustrate the method of preparing a fluoroalkyl thiophene in accordance with the present invention:

Sodium amalgam sand containing 35 grams of sodium and 25 grams of mercury was prepared in 300 c. c. of toluene. To this mixture 700 c. c. of benzene and 119 grams of 2-chlorothiophene were slowly added over a period of 2 hours. The resulting mixture was then refluxed for 6 hours in an atmosphere of nitrogen at a temperature of between about 50° C. and about 150° C. At the end of this time, 270 grams of 1,1,2-trifluoro-, 1,2,2-trichloroethane were added slowly to the reaction mixture. The mixture was again subjected to reflux at a temperature between about 50° C. and about 150° C. for 6 additional hours. At the end of this time, excess sodium was removed from the reaction product mixture with ethyl alcohol. Benzene and toluene were removed from the product by fractionation and the reaction product residue was fractionated to yield 23.5 grams of a material which was identified as 2-($\alpha,\beta$-dichloro,$\alpha,\beta,\beta$-trifluoro)ethyl thiophene.

We claim:

1. A process for preparing an alkyl thiophene containing fluorine in the alkyl group, which comprises contacting, in the presence of an inert organic solvent, sodium, a halogenated thiophene, and a heterohalogenated alkane containing fluorine, the contact between sodium and said heterohalogenated alkane containing fluorine taking place not prior to contact of sodium with said halogenated thiophene, maintaining the reaction mixture under an inert atmosphere at a temperature between about 50° C. and about 150° C., thereby effecting replacement of the halogen substituent of the thiophene reactant with a fluoroalkyl substituent.

2. A process for preparing an alkyl thiophene containing fluorine in the alkyl group, which comprises contacting, in the presence of an inert organic solvent, sodium and a halogenated thiophene, maintaining this mixture under an inert atmosphere at a temperature between about 50° C. and about 150° C. until the reaction is substantially completed and thereafter adding to the resultant mixture a heterohalogenated alkane containing fluorine and maintaining the mixture in the aforesaid temperature range to yield a fluoroalkyl thiophene.

3. A process for preparing an alkyl thiophene containing fluorine in the alkyl group, which comprises contacting, in the presence of an inert organic solvent, sodium amalgam, a monohalogenated thiophene, and a heterohalogenated alkane containing fluorine, the contact between sodium amalgam and said heterohalogenated alkane containing fluorine taking place not prior to contact of sodium with said halogenated thiophene, maintaining the resulting reaction mixture under an inert atmosphere at a temperature between about 50° C. and about 150° C., thereby effecting replacement of the halogen substituent of the thiophene reactant with a fluoroalkyl substituent.

4. A process for preparing an alkyl thiophene containing fluorine in the alkyl group, which comprises contacting sodium amalgam, chlorothiophene, and a heterohalogenated alkane containing fluorine, the contact between sodium amalgam and said heterohalogenated alkane containing fluorine taking place not prior to contact of sodium amalgam with chlorothiophene, maintaining the resulting mixture under an inert atmosphere at a temperature between about 50° C. and about 100° C., thereby effecting replacement of the chlorine substituent of the thiophene reactant with a fluoroalkyl substituent.

5. A process for preparing an alkyl thiophene containing fluorine in the alkyl group, which comprises contacting, in the presence of an inert organic solvent, sodium amalgam and a monohalogenated thiophene, maintaining this mixture under an inert atmosphere at a temperature between about 50° C. and about 150° C. until the reaction is substantially completed and thereafter adding to the resultant mixture a heterohalogenated alkane containing fluorine and maintaining the mixture in the aforesaid temperature range to yield a fluoroalkyl thiophene.

6. A process for preparing an alkyl thiophene containing fluorine in the alkyl group, which comprises contacting, in the presence of an inert organic solvent, sodium amalgam and chlorothiophene, maintaining this mixture under an inert atmosphere at a temperature between about 50° C. and about 150° C. until the reaction is substantially completed and thereafter adding to the resultant mixture a heterohalogenated alkane containing fluorine and maintaining the mixture in the aforesaid temperature range to yield a fluoroalkyl thiophene.

7. As a new composition of matter, alkylthiophene characterized by a nuclear substituted heterohalogenated alkyl chain containing fluorine.

8. As a new composition of matter, monoalkylthiophene characterized by a nuclear substituted heterohalogenated alkyl chain containing fluorine.

9. As a new composition of matter, alkylthiophene characterized by a nuclear substituted fluorine-containing heterohalogenated ethyl radical.

10. As a new composition of matter, 2-(alpha, beta-dichloro, alpha, beta, beta-trifluoro) ethyl thiophene.

WILLIAM A. STOVER.
ALEXANDER N. SACHANEN.

REFERENCES CITED

The following references are of record in the file of this patent:

Steinkopf, "Die Chemie des Thiophens," pages 45, 50, Edwards Lithoprint, Orig. 1941.

Gilman, "Organic Chemistry," Ed. 2, vol. 1, pages 540, 953, 956, 960, Wiley, N. Y., 1943.

Weygand, "Organic Preparations," page 382, Interscience, N. Y., 1945.

Bernthsen, Sudborough, "Organic Chemistry," page 549, Van Nostrand, N. Y., 1925 (1922 edition).